J. WEBSTER.
Peat Machine.
No 61,586.
Patented Jan. 29, 1867.
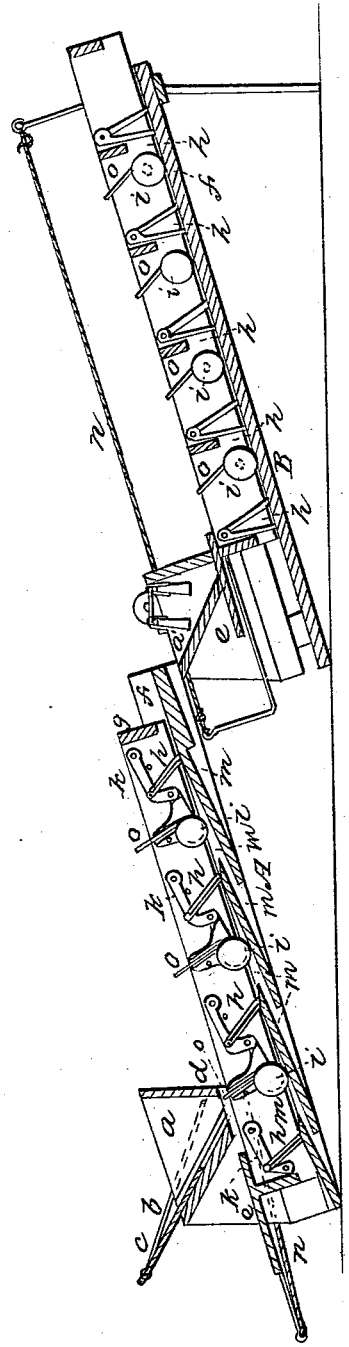
Witnesses:
S. B. Kiddet
Ab W. Frothingham.
Inventor:
Joshua Webster
by
Crosby & Gould
Attys.

United States Patent Office.

JOSHUA WEBSTER, OF MALDEN, MASSACHUSETTS.

*Letters Patent No. 61,586, dated January 29, 1867.*

IMPROVEMENT IN THE MANUFACTURE OF PEAT FUEL.

The Schedule referred to in these Letters Patent and making part of the same.

TO ALL WHOM IT MAY CONCERN:

Be it known that I, JOSHUA WEBSTER, of Malden, in the county of Middlesex, and State of Massachusetts, have invented an Improvement in the Manufacture of Peat Fuel; and I do hereby declare that the following, taken in connection with the drawings which accompany and form part of this specification, is a description of my invention sufficient to enable those skilled in the art to practise it.

The invention relates to the construction and arrangement of mechanism for converting peat into fuel, by compression of the same to remove water therefrom.

Various machines and methods have of late been devised for treating peat, to reduce its bulk and free it from water, but while many of these machines and methods have too great complication to admit of practical use, they all fail to a greater or less extent, from the fluidity or semi-fluid condition of the peat itself, the fine particles of peat being expressed with the water, leaving only the coarse, undecomposed and least valuable matter for fuel, in the press, the peat in almost all cases being treated too much in bulk.

In my invention I seek to avoid these difficulties by using, in connection with a hopper, a long trough or incline, provided with a series of presser-rolls and reciprocating followers or scrapers, the first of which receives the peat from the hoppers, and as it is driven forward shoves the peat in advance of it, and as it is driven back rises up and drags over the peat, while the roller in front presses down upon the peat and drives the water therefrom, said water escaping down the incline. The forward action of the scraper carries the peat into such position that the next rear movement of the scraper above carries it behind this peat, so that as it (the second scraper) next moves forward it carries with it the peat received from the first scraper, and the second roller acts upon this portion of the peat to press the water from it, and so on until the peat is carried over the top of the incline. By this means of intermittently moving the peat forward on the incline, and causing a presser-roll to act upon it after each movement, the peat being in a thin stratum or layer, it is brought at each movement into a fresh positon or condition for the expression of the water contained in it.

The invention consists primarily in such arrangement and method of operation of a mechanism for treating peat.

The drawing represents, in longitudinal section, a mechanism embodying said invention, two series, A and B, of scrapers and rollers being shown, though either set may be used alone, or others added as may be desirable, each series discharging into one next above it, where more than one series is used.

$a$ $a'$ denote hoppers or conductors, into which the crude peat is thrown. In the hopper $a$ is a reciprocating feeder, $b$, sliding against one wall or face of the hopper, and having a reciprocating movement imparted to it by connecting-rods $c$, extending from crank-wheels, $d$, or in any other suitable manner. Each downward movement of the feeder presses the peat lying against the wall down against a sliding bottom, $e$, which as it moves back discharges the peat into a long inclined trough, $f$. Each trough $ff'$, contains a long sliding carriage or box, $g$, opening at its bottom into the trough, and containing a series of scrapers, $h$, and presser-rollers $i$. In the trough $f$ each scraper is shown as hung on a hinge-pin, turning loosely in bearings in swinging-arms $k$, while in the trough $f'$ the hinge of each scraper-pin is journalled in stationary bearings. Behind each scraper is a presser-roll, $i$, the journals of each of which may turn in stationary bearings, (as at B,) or in bearing-plates hung to the swinging-arms $k$, as seen at A. The bottom of each trough may be made of a series of short inclines, $m$, opening out at bottom, as seen at A, or may be simply a close floor or bottom, extending the whole length of the trough, as seen at B. Each carriage, $g$, has a reciprocating longitudinal movement imparted to it, either by a band, $n$, passing round the crank-pulley $d$, or $d'$, and any suitable driving mechanism connected therewith, or in any other convenient manner, the extent of each movement being equal to or greater than the distance between the adjacent scrapers; and where a train of two or more troughs or inclines is employed, the driving mechanism may be so arranged as to drive the scrapers of all the series simultaneously. The drawing represents at A each set of scrapers at the commencement of their advance movement, in which position the peat falls into the trough in front of the lower scraper. As the scrapers advance each carries with it the peat lying in front of it, the pressure against the peat causing the scraper to fit closely against the bottom of the trough. As the scrapers next retreat the roll in advance of each presses down upon the peat and expresses the water from it, and allows the next forward scraper to ride over it, the hinging of the scraper and its inclination allowing it to tip up and pass over the peat without moving it down the trough. The rear movement of each scraper brings it behind the peat last carried forward by the scraper in rear of it, except the first one, which is brought into position to receive a fresh supply from the hopper. Each presser-roll is provided with a "doctor," o, to remove the adhering peat from its surface. Thus as the peat is intermittently moved forward, and after each forward movement is operated upon by the presser-roll, (the water expressed from it running off down or through the inclined bottom,) it is gradually brought to a homogeneous consistency, with the greater part of the water removed from it, leaving it in a condition to be readily compressed, and so reduced in bulk as to convert it into a practical, portable, and efficient fuel. A condensing, compressing, or moulding apparatus may be combined directly with this mechanism, or so that the last scraper shall discharge the peat directly into the same, in such manner as to render the whole operation upon the peat automatic, after it enters the first hopper. By hanging the scrapers and rolls of the trough $f$ on swinging-arms, each roll and scraper adapts itself to the relatively inclined surface over which it operates, as will be readily understood. The "doctor" of each roll may be made adjustable or movable to and from the surface of the roll, to compensate for wear, or to the varying condition of the peat. Instead of the sliding feeder $b$, loose pendent feeders may be arranged on a crank-shaft, as seen at B, intermixing and driving down the peat as the crank is turned.

I claim the arrangement, in connection with a hopper or other crude peat receptacle, of a series of scrapers, operating in connection with a stationary incline or bed, substantially as set forth.

Also, and in combination with such scrapers and incline, the series of presser-rolls operating substantially as set forth.

JOSHUA WEBSTER.

Witnesses:
J. B. CROSBY,
F. GOULD.